United States Patent
Akahori et al.

(10) Patent No.: US 10,731,017 B2
(45) Date of Patent: Aug. 4, 2020

(54) FOAM RUBBER MOLDED PRODUCT

(71) Applicant: TOYODA GOSEI CO., LTD., Kiyosu-shi, Aichi-ken (JP)

(72) Inventors: Naoyuki Akahori, Kiyosu (JP); Hidekazu Kurimoto, Kiyosu (JP); Yasuhiro Yamaguchi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 18 days.

(21) Appl. No.: 16/247,775

(22) Filed: Jan. 15, 2019

(65) Prior Publication Data

US 2019/0263992 A1 Aug. 29, 2019

(30) Foreign Application Priority Data

Feb. 28, 2018 (JP) ................. 2018-034685

(51) Int. Cl.
| | |
|---|---|
| *C08L 23/20* | (2006.01) |
| *C08J 9/10* | (2006.01) |
| *C08J 9/00* | (2006.01) |
| *E06B 7/23* | (2006.01) |
| *C08L 23/16* | (2006.01) |

(52) U.S. Cl.
CPC ............. *C08J 9/105* (2013.01); *C08J 9/0033* (2013.01); *C08J 9/103* (2013.01); *E06B 7/2303* (2013.01); *E06B 7/2314* (2013.01); *C08J 2201/03* (2013.01); *C08J 2323/16* (2013.01); *C08J 2423/20* (2013.01); *C08L 23/16* (2013.01); *C08L 23/20* (2013.01)

(58) Field of Classification Search
CPC . C09J 9/103; C09J 9/0061; C09J 9/105; C09J 9/0033; E06B 7/2314; E06B 7/2302; C08L 23/16; C08L 23/20; C08K 5/16; C08K 5/0025; C08J 2201/026; C08J 2423/20; C08J 2323/16
See application file for complete search history.

(56) References Cited

U.S. PATENT DOCUMENTS

2010/0317758 A1 12/2010 Okuda et al.
2016/0122520 A1* 5/2016 Jung et al. ............ C08F 210/18
525/237

FOREIGN PATENT DOCUMENTS

JP 2004-292709 A 10/2004
JP 2011-016978 A 1/2011

* cited by examiner

*Primary Examiner* — Nathan M Nutter
(74) *Attorney, Agent, or Firm* — Posz Law Group, PLC

(57) ABSTRACT

A foam rubber molded produce obtained by molding a rubber composition containing 100 parts by mass of ethylene-α-olefin-nonconjugated diene copolymer, 4 to 30 parts by mass of amorphous 4-methyl-1-pentene copolymer, 2 to 8 parts by mass of blowing agent, and a sulfur-based vulcanizing agent, and having a Mooney viscosity after kneading (ML1+4, 100° C.) of 54 or less. A specific gravity is 0.3 to 0.8, a compression set is less than 27%, and a foam state is an interconnected cell.

4 Claims, 2 Drawing Sheets

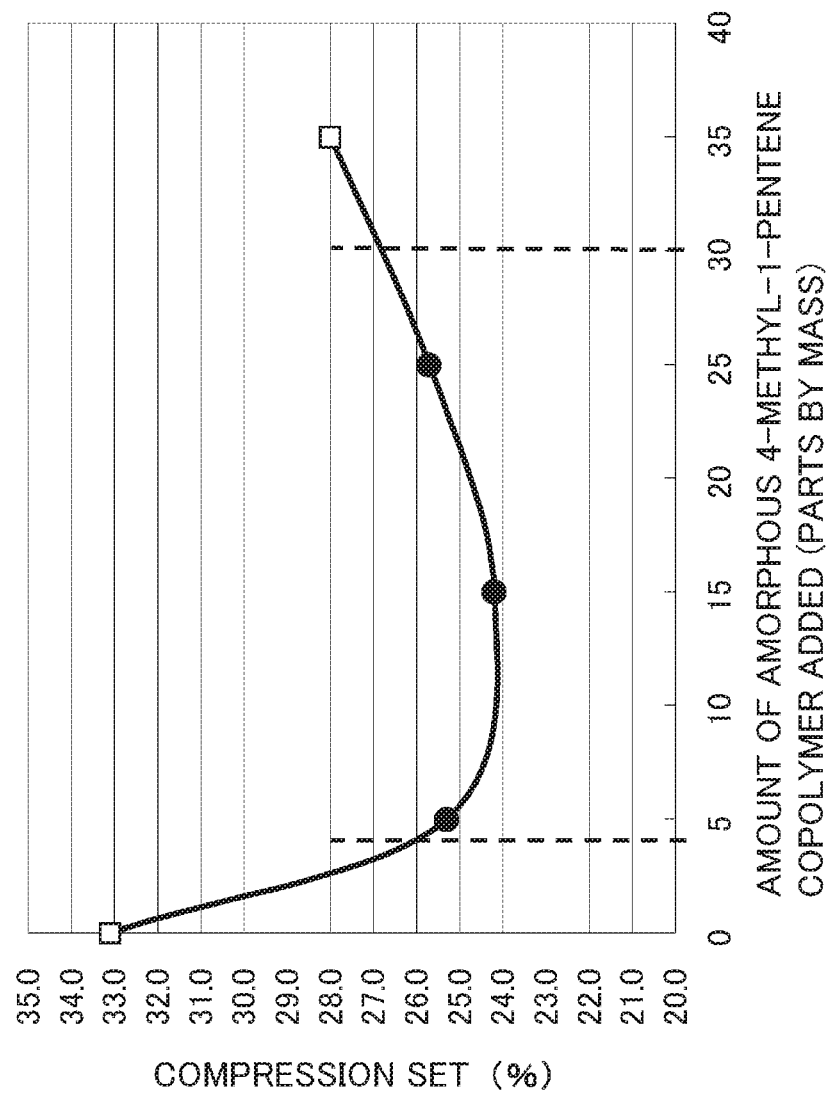
F I G. 2

FOAM RUBBER MOLDED PRODUCT

TECHNICAL FIELD

The present invention relates to a foam rubber molded product.

BACKGROUND ART

A foam rubber molded product has been widely used, for example, for sealing parts (a weatherstrip to be attached to an automobile body, a sealing material for a door opening and closing parts of a house, etc.), general-purpose buffer materials and the like. As a rubber polymer for the foam rubber molded product, an ethylene-α-olefin-nonconjugated polyene copolymer (especially, ethylene-propylene-diene rubber (EPDM)) having excellent aging resistance and ozone resistance has mostly been used.

For a weatherstrip, sealing properties, setting resistance, lightweight properties, and the like are required. For weight saving and the like, a foam rubber is used in a weatherstrip. For further weight saving, a rubber is highly foamed to decrease the specific gravity thereof. In this case, the compression set (i.e., "setting") is increased. Therefore, there is a problem in which the sealing performance of a product is deteriorated.

Patent Document 1 discloses a composition in which a crystallizable polyolefin resin is microdispersed in an EPDM matrix to form in the inside thereof a cell structure including an interconnected cell imparting favorable compression set and that has excellent lightweight properties (high foaming properties), and a foam.

Patent Document 2 also discloses a composition in which a crystallizable polyolefin resin is preferably microdispersed in an EPDM matrix, weight saving can be achieved, and deterioration in compression set is prevented.

CITATION LIST

Patent Documents

[Patent Document 1] Japanese Patent Application Publication No. 2004-292709 (JP 2004-292709 A)
[Patent Document 2] Japanese Patent Application Publication No. 2011-16978 (JP 2011-16976 A)

SUMMARY OF INVENTION

Technical Problem

From investigation of the present inventor, such a crystallizable olefin resin as used in Patent Documents 1 and 2 is not easily mixed in EPDM. Further, due to high melting point (In Patent Document 1, the kneading temperature is 80 to 170° C., and in Patent Document 2, the kneading temperature is 80 to 250° C.), higher temperature and higher pressure than those under a typical rubber kneading condition are required as a kneading condition for uniform microdispersion. Therefore, the setting and control of the kneading condition are difficult/microdispersion is ununiform, and an effect for improving setting resistance is not sufficient. Accordingly, there is a problem in which physical properties are likely to vary depending on a product.

An object of the present invention is to provide a foam rubber molded product that has a homogeneous interconnected cell and can stably achieve both high foaming and setting resistance.

Solution to Problem

The present inventor has further investigated. As a result, addition of amorphous olefin polymer to an ethylene-α-olefin-nonconjugated diene copolymer can achieve easy formation of alloy under a typical rubber kneading condition without especially increasing the temperature and pressure. However, the inventor has faced with a problem in which the initially added amorphous olefin polymer does not form an interconnected cell Ea plurality of foam cells are connected with each other). The inventor has further investigated, and as a result, found that when an amorphous 4-methyl-1-pentene copolymer is added, an interconnected cell is formed. The inventor has found that addition of a small amount of amorphous 4-methyl-1-pentene copolymer achieves excellent setting resistance without impairing processability as compared with a case of no addition of amorphous-4-methyl-1-pentene copolymer. Thus, the present invention has been completed.

A foam rubber molded product of the present invention is a foam rubber molded product obtained by molding a rubber composition containing 100 parts by mass of ethylene-α-olefin-nonconjugated diene copolymer, 4 to 30 parts by mass of amorphous 4-methyl-1-pentene copolymer, 2 to 8 parts by mass of blowing agent, and a sulfur-based vulcanizing agent, and having a Mooney viscosity after kneading (ML1+4, 100° C.) of 54 or less. A specific gravity of the foam rubber molded product is 0.3 to 0.8. A compression set of the foam rubber molded product is less than 27%. A foam state is an interconnected cell.

It is preferable that the rubber composition further contain 45 to 87 parts by mass of process oil. From the viewpoint of easy processing, the amount of the process oil is preferably 45 parts by mass or more, and from the viewpoint of preventing bloom, it is preferably 87 parts by mass or less.

[Action]

When a small amount of amorphous 4-methyl-1-pentene copolymer is added to an ethylene-α-olefin-nonconjugated diene copolymer as described above, the amorphous 4-methyl-1-pentene copolymer can be uniformly dispersed in a matrix of the ethylene-α-olefin-nonconjugated diene copolymer with ease under a typical rubber kneading condition without especially increasing the temperature and pressure. Further, a foam including a homogeneous interconnected cell can be obtained, and both high foaming and setting resistance can be stably achieved. The amorphous 4-methyl-1-pentene copolymer is a polymer that is "easily kneaded" and "forms an interconnected cell" as described above, and therefore desired effects are obtained. In addition, the amorphous 4-methyl-1-pentene copolymer is a polymer "having excellent stress relaxation," and therefore an action of absorbing stress during deformation and not preventing recovery is obtained. These are considered to contribute to sealing properties and setting resistance.

Advantageous Effects of Invention

The present invention can provide a foam rubber molded product that has a homogeneous interconnected cell and can stably achieve both high foaming and setting resistance.

BRIEF DESCRIPTION OF DRAWINGS

FIG. 2 is a graph in which the horizontal axis is the amount of amorphous 4-methyl-1-pentene copolymer added, the vertical axis is the compression set, and data in Examples 1, 2, and 3 and Comparative Examples 1 and 3 are plotted.

DESCRIPTION OF EMBODIMENTS

1. Ethylene-α-Olefin-Nonconjugated Diene Copolymer

Figure 1A:
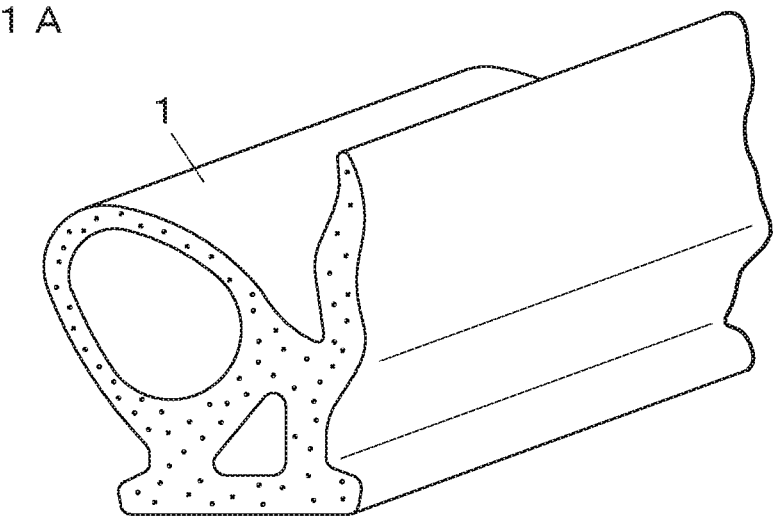
FIG. 1A is a perspective view of a weatherstrip as an example of a foam rubber molded product in Examples.

Examples of α-olefin include, but are not particularly limited to, propylene, 1-butene, 1-pentene, 1-hexene, 4-methyl-1-pentene, 1-octene, and 1-decene. Among these, propylene is preferable.

Examples of nonconjugated diene include, but are not particularly limited to, 1,4-hexadiene, dicyclopentadiene, and 5-ethylidene-2-norbornene.

2. Blowing Agent

Examples of blowing agent include, but are not particularly limited to, 4,4'-oxybis(benzenesulfonyl hydrazide) (OBSH), azodicarbonamide (ADCA), N,N'-dinitrosopentamethylenetetramine (DPT), p-toluenesulfonylhydrazide (TSH),2,2'-azobisisobutyronitrile (AIBN), and sodium bicarbonate.

3. Sulfur-Based Vulcanizing Agent

Examples of sulfur-based vulcanizing agent include, but are not particularly limited to, sulfur, sulfur compounds, maleimides, and organic sulfur-containing vulcanizing agents. One type of the sulfur-based vulcanizing agent may be used alone, or two or more types thereof nay be used in combination.

In order to promote vulcanization, a vulcanization accelerator may be appropriately added. Examples of the vulcanization accelerator include thiuram-based, dithiocarbamate-based, thiazole-based, guanidine-based, morpholine-based, sulfenamide-based, and dithiophosphoric acid-based vulcanization accelerators. One or two or more types of the vulcanization accelerators may be used.

4. Plasticizer

In order to impart plasticity to the composition and facilitate processing, a plasticizer may be appropriately added. Examples of the plasticizer include, but are not particularly limited to, petroleum-based plasticizers such as process oil (paraffinic, naphthene-based, aromatic, etc.), lubricating oil, petroleum asphalt, and vaseline, coal tar-based softening agents such as coal tar and coal tar pitch, fatty oil-based plasticizers such as castor oil, linseed oil, rapeseed oil, and coconut oil, waxes such as beeswax, carnauba wax, and lanolin, fatty acid such as ricinoleic acid and palmitic acid, fatty acid salts such as barium stearate, calcium stearate, and zinc laurate, synthesis high-molecular substances such as a petroleum resin, atactic polypropylene, and a coumaroneindene resin, a tall oil, and a rubber substitute (factice).

5. Other Mixing Materials

In addition to the aforementioned mixing materials, a filler, a processing aid, a cross-linking co-agent, a blowing aid, an age resistor, an acid acceptor, a scorch retarder, or a colorant may be appropriately mixed.

Example of filler include carbon black, calcium carbonate, talc, silica, and baked clay.

Examples of the processing aid include fatty acids such as stearic acid.

Examples of the cross-linking co-agent include polyethylene glycol (PEG), fatty acid salts such as zinc oxide (ZnO, zinc white) and zinc stearate, and magnesium oxide.

Examples of the blowing aid include urea and sodium benzenesulfonate.

6. Foam Rubber Molded Product

Examples of application of the foam rubber molded product include, but are not particularly limited to, sealing parts (a weatherstrip of an automobile, a sealing material for a door opening and closing part of a house, etc.) and general-purpose buffer materials. In particular, a weatherstrip is suitable.

EXAMPLES

Rubber compositions of Examples 1 to A and Comparative Examples 1 to 5, shown as mixing compositions in Table 1, were produced.

TABLE 1

|  | Type of mixing material | Mixing Materials | Comparative Example 1 | Comparative Example 2 | Example 1 | Example 2 | Example 3 |
|---|---|---|---|---|---|---|---|
| Mixing compositions (parts by mass) | Rubber | EPDM | 100 | 100 | 100 | 100 | 100 |
|  | Oil | Process oil | 90 | 75 | 85 | 75 | 65 |
|  | Polymer | EPM | — | 15 | — | — | — |
|  |  | Amorphous 4-methyl-1-pentene copolymer | — | — | 5 | 15 | 25 |
|  | Compounding agent | Carbon black | 120 | 120 | 120 | 120 | 120 |
|  |  | Calcium carbonate | 50 | 50 | 50 | 50 | 50 |
|  |  | Zinc white | 7 | 7 | 7 | 7 | 7 |
|  |  | Stearic acid | 1 | 3 | 3 | 3 | 3 |
|  |  | Fatty acid ester processing aid | 1 | 1 | 1 | 1 | 1 |
|  |  | Other | 5 | 5 | 5 | 5 | 5 |
|  | Vulcanizing agent and Vulcanization accelerator | Sulfur compounds | 0.9 | 0.9 | 0.9 | 0.9 | 0.9 |
|  |  | Thiazole-based | 1.8 | 1.8 | 1.8 | 1.8 | 1.8 |
|  |  | Dithiocarbamate-based | 1.3 | 1.3 | 1.3 | 1.3 | 1.3 |
|  |  | Thiuram-based | 1.2 | 1.2 | 1.2 | 1.2 | 1.2 |
|  |  | Guanidine-based | 0.6 | 0.6 | 0.6 | 0.6 | 0.6 |
|  |  | Morpholine-based | — | — | — | — | — |
|  | Blowing agent | OBSH blowing agent | 4.05 | 4.05 | 4.05 | 4.05 | 4.05 |
|  |  | ADCA blowing agent | — | — | — | — | — |
| Evaluation Items | Physical properties of kneaded product | Mooney viscosity ML1 + 4, 100° C. | 40.1 | 54.1 | 41.2 | 42.8 | 46.0 |
|  | Physical properties of foam rubber | Specific gravity | 0.6 | 0.7 | 0.6 | 0.6 | 0.7 |
|  |  | 100% modulus (Mpa) | 1.0 | 1.1 | 1.3 | 1.7 | 2.2 |
|  |  | Breaking strength (Mpa) | 3.0 | 2.7 | 2.9 | 3.4 | 4.2 |

TABLE 1-continued

|  |  |  | | | | | |
|---|---|---|---|---|---|---|---|
|  |  | Elongation at break (%) | 240 | 200 | 200 | 200 | 180 |
|  |  | Water absorption (%) | 1.0 | 1.7 | 55.2 | 46.5 | 38.5 |
|  |  | Compression set (%) | 33.1 | 27.7 | 25.3 | 24.2 | 25.7 |
|  |  | Comprehensive evaluation | Poor | Poor | Good | Good | Good |

| | Type of mixing material | Mixing Materials | Comparative Example 1 | Comparative Example 2 | Comparative Example 5 | Example 4 |
|---|---|---|---|---|---|---|
| Mixing compositions (parts by mass) | Rubber | EPDM | 100 | 100 | 100 | 100 |
| | Oil | Process oil | 55 | 62 | 47 | 47 |
| | Polymer | EPM | — | — | 15 | — |
| | | Amorphous 4-methyl-1-pentene copolymer | 35 | — | — | 15 |
| | Compounding agent | Carbon black | 120 | 102 | 102 | 102 |
| | | Calcium carbonate | 50 | 22 | 22 | 22 |
| | | Zinc white | 7 | 7 | 7 | 7 |
| | | Stearic acid | 3 | 1.5 | 1.5 | 1.5 |
| | | Fatty acid ester processing aid | 1 | 1 | 1 | 1 |
| | | Other | 5 | 2 | 2 | 2 |
| | Vulcanizing agent and Vulcanization accelerator | Sulfur compounds | 0.9 | 2 | 2 | 2 |
| | | Thiazole-based | 1.8 | 2 | 2 | 2 |
| | | Dithiocarbamate-based | 1.3 | 2 | 2 | 2 |
| | | Thiuram-based | 1.2 | 0.5 | 0.5 | 0.5 |
| | | Guanidine-based | 0.6 | — | — | — |
| | | Morpholine-based | — | 0.7 | 0.7 | 0.7 |
| | Blowing agent | OBSH blowing agent | 4.05 | 3.83 | 3.83 | 3.83 |
| | | ADCA blowing agent | — | 2.02 | 2.02 | 2.02 |
| Evaluation Items | Physical properties of kneaded product | Mooney viscosity ML1 + 4, 100° C. | 47.9 | 46.1 | 60.8 | 54.0 |
| | Physical properties of foam rubber | Specific gravity | 0.7 | 0.4 | 0.4 | 0.4 |
| | | 100% modulus (Mpa) | 2.8 | 1.0 | 1.2 | 1.6 |
| | | Breaking strength (Mpa) | 4.5 | 2.0 | 2.2 | 3.0 |
| | | Elongation at break (%) | 160 | 200 | 88 | 180 |
| | | Water absorption (%) | 28.5 | 42.9 | 47.8 | 35.8 |
| | | Compression set (%) | 28.0 | 29.0 | 28.0 | 25.0 |
| | | Comprehensive evaluation | Poor | Poor | Poor | Good |

Herein, EPDM is trade name "Mitsui EPT 8120E" available from Mitsui Chemicals, Inc.

A process oil is a paraffinic process oil.

An ethylene-propylene rubber (EPM) is trade name "EP11" available from JSR Corporation.

An amorphous 4-methyl-1-pentene copolymer is trade name "ABSORTOMER EP1001" available from Mitsui Chemicals, Inc.

The rubber compositions were each kneaded under the following kneading condition.

EPDM was placed alone in an internal mixer, and then masticated for 30 seconds.

An oil, a polymer, a compounding agent, and a blowing agent shown in Table 1 were further added to the internal mixer, and the mixture was kneaded for a total of 220 seconds. At that time, the kneading temperature was increased from about 50° C. to about 150° C.

The composition obtained after kneading was processed into a roll, and cooled in a tape shape.

The composition after cooling, and a vulcanizing agent and a vulcanization accelerator shown in Table 1 were placed in a kneader, and kneaded for 60 seconds. At that time, the kneading temperature was about 60° C.

The composition obtained after kneading was processed into a roll, kneaded by a mill blender for 60 seconds, and cooled in a tape shape. Subsequently, the Mooney viscosity (ML(1+4), 100° C.) was measured. The Mooney viscosity is shown in Table 1.

Figure 1B:
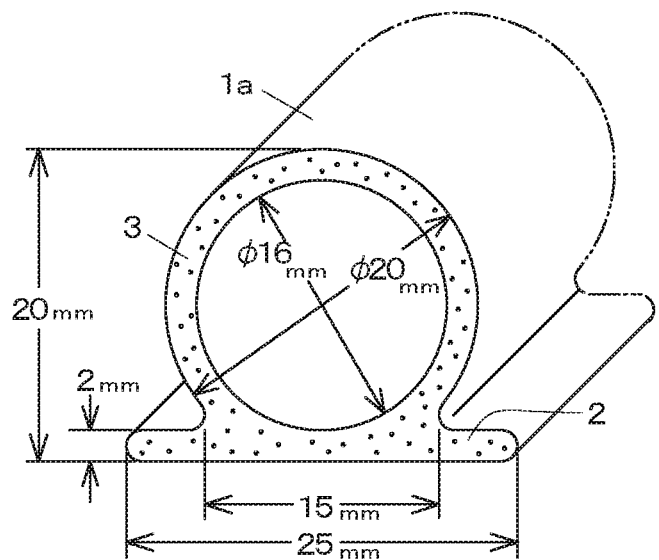
FIG. 1B is a view illustrating the dimension of a foam rubber molded product produced as a sample.

From the thus kneaded rubber composition, for example, a weatherstrip 1 for an automobile shown in FIG. 1A can be molded as a foam rubber molded product. Herein, a foam rubber molded product in a shape of Type 2 dumbbell (not shown) was molded as a sample for measurement of the following specific gravity, 100% modulus, breaking strength, and elongation at break, and a foam rubber molded product 1a in a weatherstrip shape including a plate-shaped base 2 and a cylindrical hollow 3, as shown in FIG. 1B, was molded as a sample for measurement of the following water absorption and compression set. In the molding, the rubber composition was subjected to extrusion-molding using an extrusion-molding machine. The rubber composition was then subjected to UHF vulcanization in an ultra-high frequency vulcanisation (UHF) tank of 200° C., followed by HAV vulcanization through a hot air vulcanization (HAV) tank of 240° C.

The specific gravity, 100% modulus, breaking strength, and elongation at break of the foam rubber molded product in a shape of Type 2 dumbbell (not shown) were measured. In the measurement of 100% modulus, breaking strength, and elongation at break, a tensile test was performed at room temperature in accordance with JIS K6251 "vulcanized rubber and thermoplastic rubber—Determination of tensile properties." These physical properties are shown in Table 1.

The foam rubber molded product 1a in a shape of weatherstrip shown in FIG. 1B was cut into a length of 45 mm, and the initial weight thereof was measured. The foam rubber molded product 1a was added to water of 35° C. in a beaker. The beaker was disposed under a reduced pressure of 630 mmHg, and the foam rubber molded product was immersed in water for 60 minutes, and taken out from the beaker. The weight of the foam rubber molded product 1a (after absorption) was measured. The water absorption (%) was calculated by the following expression. The results are shown in Table 1. In the present description, when the water absorption is 5% or more, the foam state is evaluated as an interconnected cell.

Water absorption=(weight after absorption−initial weight)/(initial weight)×100

Figure 1C:
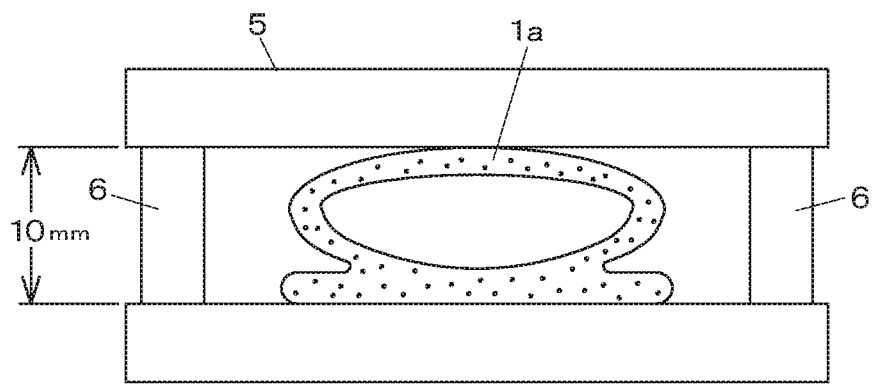
FIG. 1C is a view illustrating a method for testing the compression set of the foam rubber molded product.

The foam rubber molded product 1a in a shape of weatherstrip shown in FIG. 1B was cut into a length of 45 mm as a specimen, and the heights thereof at three positions (height before a test) were measured. The specimen and a spacer 6 of which the length was 50% of the height at a center of length of the specimen were set in a compression device 5 shown in FIG. 1C, and compressed in the height direction. The specimen and the spacer 6 were disposed with the compression device 5 in a constant temperature bath (not shown) of which the temperature was set to 70° C., allowed to stand for 200 hours, and then taken out from the constant temperature bath. The foam rubber molded product 1a was rapidly released from the compression device 5, and allowed to remain at room temperature for 30 minutes. Subsequently, the heights at the three positions (height after the test) were measured. The compression set (%) (average of the heights at the three positions) was calculated by the following expression. The results are shown in Table 1.

Compression set=(height before test−height after test)/(height before test−height of spacer)×100

<Results of Evaluation Items>

The rubber composition in Comparative Example 1 contained 90 parts by mass of process oil to secure processability. The Mooney viscosity after kneading of the rubber composition was as low as 40.1, but the compression set of the foam rubber molded product was as high as 33%. The water absorption of the foam rubber molded product was 1.0%. This shows that the foam state is a closed cell.

The rubber composition in Comparative Example 2 contained 75 parts by mass of process oil, and 15 parts by mass of EPM. The Mooney viscosity after kneading of the rubber composition was as high as 54.1, and the compression set of the foam rubber molded product was 28%. The Mooney viscosity and the compression set were improved, but were not sufficient. The water absorption of the foam rubber molded product was 1.7%. This shows that the foam state is a closed cell.

The rubber compositions in Examples 1 to 4 contained 47 to 85 parts by mass of process oil, and 5 to 25 parts by mass of amorphous 4-methyl-1-pentene copolymer. The Mooney viscosities after kneading of the rubber compositions were as high as 41.2 to 54.0, and the compression sets of the foam rubber molded products were 24.2 to 25.7%. The Mooney viscosities and the compression sets were improved. The water absorption of the foam rubber molded product was 35% or more. This shows that the foam state is an interconnected cell.

FIG. 2 is a graph in which the horizontal axis is the amount of amorphous 4-methyl-1-pentene copolymer added, the vertical axis is the compression set, and data in Examples 1, 2, and 3 and Comparative Examples 1 and 3 are plotted on the basis of the aforementioned results. When the amount of amorphous 4-methyl-1-pentene copolymer added is 4 to 30 parts by mass, the compression set is less than 27%. This shows that excellent setting resistance is obtained.

The present invention is not limited to Examples described above, and the present invention can be appropriately modified and embodied without departing from the spirit of the present invention.

REFERENCE SIGNS LIST

1 Foam rubber molded product
1a Foam rubber molded product
2 Base
3 Hollow
5 Compression device
6 Spacer

The invention claimed is:

1. A foam rubber molded product obtained by molding a rubber composition containing 100 parts by mass of ethylene-α-olefin-nonconjugated diene copolymer, 4 to 30 parts by mass of amorphous 4-methyl-1-pentene copolymer, 2 to 8 parts by mass of blowing agent, and a sulfur-based vulcanizing agent, and having a Mooney viscosity after kneading (ML1=4, 100° C.) of 54 or less, wherein a specific gravity is 0.3 to 0.8, a compression set is less than 27%, and a foam state is an interconnected cell.

2. The foam rubber molded product according to claim 1, wherein the rubber composition further contains 45 to 87 parts by mass of process oil.

3. The foam rubber molded product according to claim 1, wherein the foam rubber molded product is a weatherstrip.

4. The foam rubber molded product according to claim 2, wherein the foam rubber molded product is a weatherstrip.

* * * * *